United States Patent Office 2,961,852
Patented Nov. 29, 1960

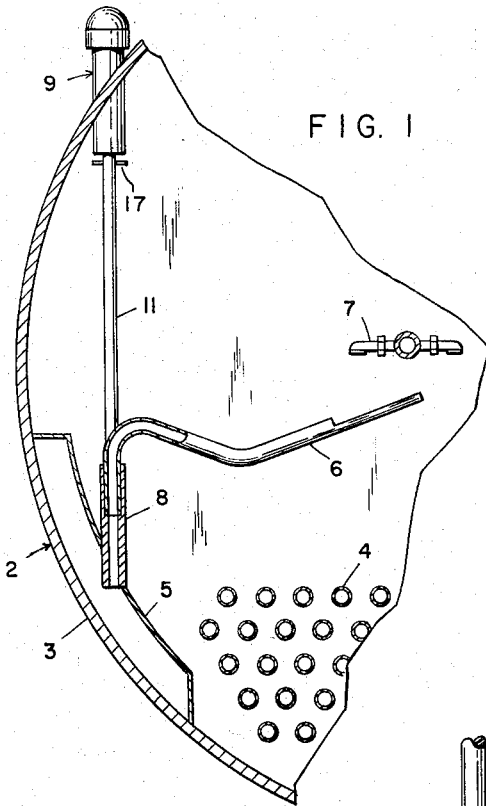
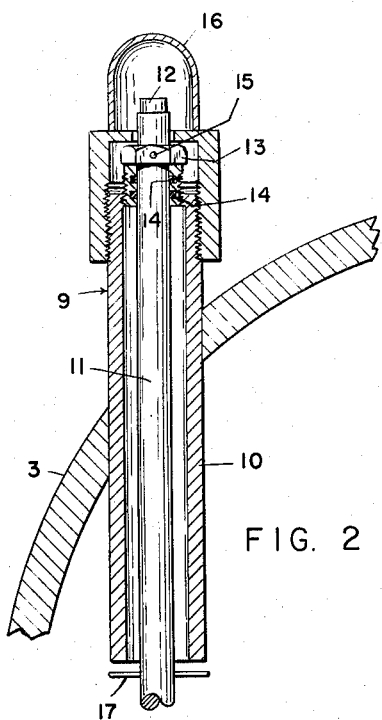
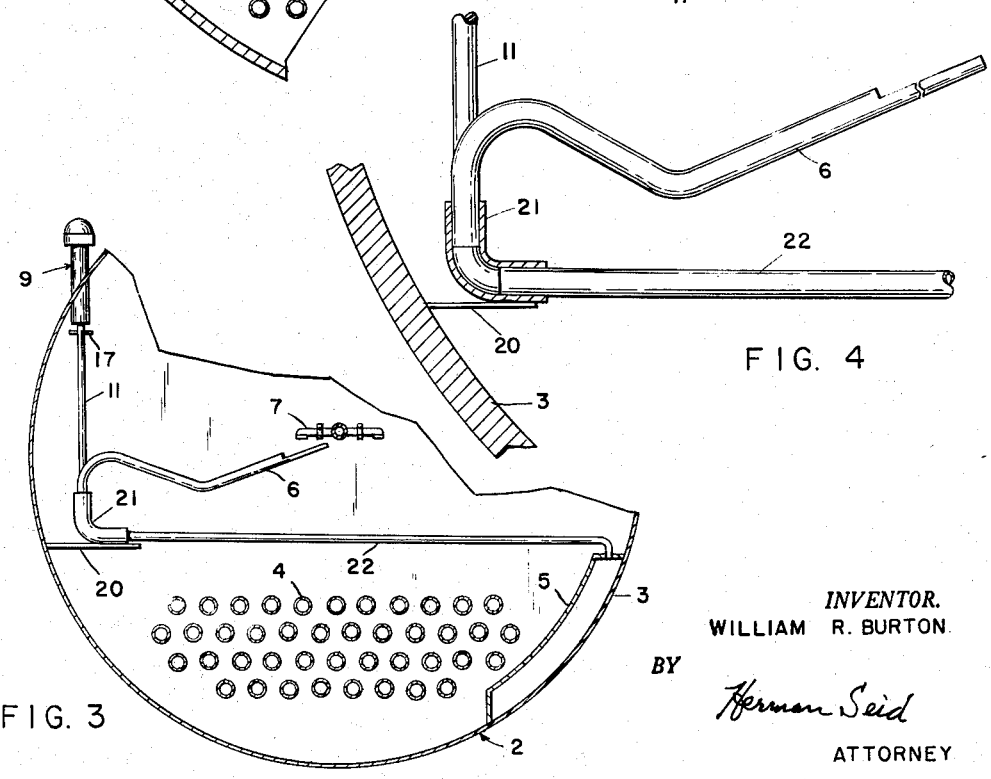
INVENTOR.
WILLIAM R. BURTON

2,961,852

ABSORPTION REFRIGERATION SYSTEMS

William R. Burton, Syracuse, N.Y., assignor to Carrier Corporation, Syracuse, N.Y., a corporation of Delaware Filed Mar. 21, 1957, Ser. No. 647,581

9 Claims. (Cl. 62—494)

This invention relates to absorption refrigeration machines and, more particularly, to absorption refrigeration machines including a drip member placed beneath spray members in the absorber to collect a minor amount of solution being discharged by the spray members and means for adjusting the position of the drip member to vary the amount of solution being collected thereby.

In the copending application of Louis H. Leonard, Jr., Serial No. 565,324, filed February 14, 1956, entitled "Purging Arrangement for Absorption Refrigeration Systems," there is disclosed a purging arrangement for purging non-condensible gases from the absorber of an absorption refrigeration system. In this arrangement, there is provided a container for solution and means in the container connected to a purge line within the absorber for withdrawing non-condensible gases from the absorber. During the purging process, some amount of refrigerant vapor is gradually removed from the absorber and condensed in the container gradually decreasing the concentration of solution therein. Preferably, a drip tube is fixed in the absorber to collect a small amount of strong solution and to supply the collected solution to the container to maintain a desired solution concentration in the container as long as possible.

I have found that manufacturing problems exist in the proper placement of the drip tube during assembly of the absorber. In some cases, the drip tube has been placed in a position in which it does not collect solution while in other cases, it has been placed in positions in which it collects too great or too little a quantity of solution. It is difficult or impossible to ascertain improper placement of the drip tube until the system has been placed in operation. Correction is then highly expensive for the absorber must be opened, losing vacuum, to permit adjustment.

The present invention is concerned with ready, inexpensive and simple means for adjusting the drip tube during operation of the machine.

The chief object of the invention is to provide inexpensive means for adjusting the drip tube during operation of the absorption refrigeration machine without breaking the vacuum in the machine thus permitting easy and simple variation in the quantity of strong solution being collected by the drip tube.

An object of the invention is to provide an adjustment member which extends through the shell of the absorber and which is operatively connected to the drip tube to rotate the tube in a horizontal arc, the adjustment member being sealed to prevent atmospheric gases leaking into the absorber. Other objects of the invention will be readily perceived from the following description.

This invention relates to the combination with an absorption refrigeration machine including an absorber, spray members in the absorber and a drip member in the absorber placed beneath the spray members to collect solution being discharged by the spray members of means for adjusting the drip member to vary the amount of solution being collected by the drip member.

The attached drawing illustrates preferred embodiments of the invention, in which:

Figure 1 is a fragmentary sectional view through the absorber of an absorption refrigeration machine illustrating the invention;

Figure 2 is a sectional view of the adjustment means of the invention;

Figure 3 is a fragmentary sectional view similar to Figure 1 illustrating a modification; and Figure 4 is a fragmentary sectional view illustrating the connection between the drip tube and the drain tube shown in Figure 3.

Referring to the drawing, there is shown in Figures 1 and 2 the adjustment means for the drip tube placed in position in the absorption refrigeration machine. Reference is made to the Leonard application discussed above, for a description of the absorption refrigeration machine and the purge arrangement therefor.

As shown in Figure 1, the absorber 2 of the absorption refrigeration system is enclosed in a shell 3, the absorber including the tubes 4 through which cooling medium is passed to cool solution in the absorber. A collection chamber 5 is provided in the absorber. A drip tube 6 collects a minor amount of strong solution being discharged within the absorber shell by spray members 7. An end of the drip tube extends within an end of a sleeve 8 which extends through the wall of chamber 5. Actuating means 9 are provided to rotate the drip tube 6 through a horizontal arc of 180°.

Actuating means 9 include a housing 10 which extends through the shell 3 into the interior of the absorber. An actuating rod 11 extends through the housing and is operatively connected to the drip tube 6, preferably being welded thereto, so that as rod 11 is rotated, drip tube 6 is rotated through a horizontal arc of 180°.

The end of rod 11, preferably, has a suitable wrench connection 12 to permit the rod to be grasped easily and rotated. A gland 13 carrying O-rings 14 to seal the rod, is threadedly connected to the housing. A set screw 15 is used to secure the actuating rod 11 in place within the gland. A cap seal cover 16 is threadedly connected to the exterior of housing 10. Thus, the gland O-rings and the seal cover prevent atmospheric gases from leaking into the absorber about the actuating rod 11. Preferably, a stop pin 17 is attached to the rod to prevent the drip tube 6 being removed from sleeve 8 upon rotation of the rod.

When it is desired to adjust the rate of collection of strong solution by the drip tube 6 during operation of the absorption refrigeration system, the seal cover 16 is removed, the set screw 15 loosened, and the rod 11 rotated to rotate or swing the drip tube 6 in a horizontal arc as desired. The level of solution in the purge container is noted, and the drip tube adjusted to provide the desired amount of strong solution thereto. The set screw 15 is then tightened and the seal cover replaced.

In Figures 3 and 4, I have illustrated a modification in which the collection chamber is placed on the opposite side of the absorber. In this case, a support 20 is attached to the interior wall of shell 3 and an elbow 21 supported thereon. The end of the drip tube 6 extends within one end of elbow 21 (instead of sleeve 8). A drain tube 22 extends within the opposite end of elbow 21 and is inclined downward slightly so that solution will flow through tube 22 to the collection chamber 5. Actuating means 9 for drip tube 6 are as described previously.

The present invention provides an inexpensive, simple adjustment means for a drip tube in an absorber of an absorption refrigeration machine to assure that a desired volume of strong solution may be provided to a purge arrangement. The present invention permits the position of the drip tube to be varied during operation of the absorption refrigeration machine without breaking the vacuum in the absorber thus greatly decreasing the expenses involved when it is necessary to open the machine to permit such adjustment.

While I have described a preferred embodiment of the invention, it will be understood the invention is not limited thereto since it may be otherwise embodied within the scope of the following claims.

I claim:

1. The combination with an absorption refrigeration machine including an absorber, spray members in the absorber and a drip member in the absorber placed beneath the spray members to collect solution being discharged by the spray members, of an actuating rod operatively connected to the drip member to rotate the same through a horizontal arc, and means adapted to rotate said rod.

2. The combination with an absorption refrigeration machine including an absorber, spray members in the absorber, and a drip member in the absorber placed beneath the spray members to collect solution being discharged by the spray members, of means for adjusting the drip member to vary the amount of solution being collected by the drip member, said means comprising a housing extending through the shell of the absorber, an actuating rod extending through the housing operatively connected to the drip member, means sealing the rod in the housing to prevent ambient gases entering the absorber, said rod terminating in means permitting rotation of the rod, and a cover seal member placed over the end of the rod removably connected to the housing.

3. The combination according to claim 2 in which the cover seal member is threadedly connected to the housing.

4. The combination according to claim 3 in which a gland is threadedly connected to the housing and O-rings, carried by said gland, seal said rod.

5. The combination according to claim 4 in which a stop member is attached to the rod.

6. The combination with an absorption refrigeration machine including an absorber, spray members in the absorber, a collection chamber in the absorber, and a drip member in the absorber beneath the spray members to collect solution being discharged by the spray members, of means for adjusting the drip member to vary the amount of solution being collected by the drip member, and a drain tube operatively connecting the drip member to the chamber.

7. The combination with an absorption refrigeration machine according to claim 6 in which a support is provided in the shell of the absorber, an elbow is supported on the support, the end of the drip member extending within one end of the elbow, an end of the drain tube extending within the other end of the elbow, the drain tube extending across the shell to the collection chamber.

8. The combination with an absorption refrigeration machine including an absorber, spray members in the absorber and a drip member in the absorber placed beneath the spray members to collect solution being discharged by the spray members, of means for adjusting the drip member to vary the amount of solution being collected by the drip member, said means rotating the drip member through a horizontal arc.

9. The combination according to claim 8 in which the means rotates the drip member through a horizontal arc of 180°.

References Cited in the file of this patent

UNITED STATES PATENTS

| | | |
|---|---|---|
| 1,776,817 | Mugler | Sept. 30, 1930 |
| 2,610,482 | Berry | Sept. 16, 1952 |